US012643149B2

(12) United States Patent (10) Patent No.: US 12,643,149 B2
Dunbar et al. (45) Date of Patent: Jun. 2, 2026

(54) MELT POOL CONTROL IN ADDITIVE MANUFACTURING SYSTEMS

(71) Applicant: VulcanForms Inc., Devens, MA (US)

(72) Inventors: Alexander Dunbar, Watertown, MA (US); Raghav Aggarwal, Dracut, MA (US)

(73) Assignee: VulcanForms Inc., Devens, MA (US)

( * ) Notice: Subject to any disclaimer, the term of this patent is extended or adjusted under 35 U.S.C. 154(b) by 1018 days.

(21) Appl. No.: 17/190,890

(22) Filed: Mar. 3, 2021

(65) Prior Publication Data

US 2021/0339318 A1 Nov. 4, 2021

Related U.S. Application Data

(60) Provisional application No. 63/018,542, filed on May 1, 2020.

(51) Int. Cl.
B22F 10/28 (2021.01)
B22F 10/85 (2021.01)
(Continued)

(52) U.S. Cl.
CPC .............. B22F 10/28 (2021.01); B22F 10/85 (2021.01); B22F 12/41 (2021.01);
(Continued)

(58) Field of Classification Search
CPC .......... B22F 10/28; B22F 10/85; B22F 12/41; B22F 12/45; B33Y 10/00; B33Y 30/00;
(Continued)

(56) References Cited

U.S. PATENT DOCUMENTS

| | | | |
|---|---|---|---|
| 9,956,612 B1 | 5/2018 | Redding et al. | |
| 10,022,795 B1 | 7/2018 | Redding et al. | |
| (Continued) | | | |

FOREIGN PATENT DOCUMENTS

| | | | |
|---|---|---|---|
| EP | 3 521 028 A1 | 8/2019 | |
| WO | WO-2020047526 A1 * | 3/2020 | .............. B22F 10/36 |
| WO | WO 2025/006255 A2 | 1/2025 | |

OTHER PUBLICATIONS

Height Dependent laser metal deposition process modeling Patrick M. Sammons Missouri S&T Library and Learning Resources https://scholarsmine.mst.edu/cgi/viewcontent.cgi?article=8445&context=masters_theses (Year: 2012).*

(Continued)

*Primary Examiner* — Jimmy Chou
(74) *Attorney, Agent, or Firm* — Wolf, Greenfield & Sacks, P.C.

(57) ABSTRACT

Systems and methods for additive manufacturing are described. In some embodiments, a method of controlling a weld height in an additive manufacturing process includes determining a desired melt pool width based, at least in part, on a desired weld height; selectively activating one or more laser energy sources based, at least in part, on the desired melt pool width; and melting a portion of a layer of material on a build surface via exposure to laser energy from the one or more activated laser energy sources to form a melt pool on the build surface having the desired melt pool width. Systems and methods to the use of staggered laser energy sources are also described.

39 Claims, 8 Drawing Sheets

(51) Int. Cl.

| | |
|---|---|
| *B22F 12/41* | (2021.01) |
| *B23K 26/00* | (2014.01) |
| *B23K 26/03* | (2006.01) |
| *B23K 26/06* | (2014.01) |
| *B23K 26/342* | (2014.01) |
| *B33Y 10/00* | (2015.01) |
| *B33Y 30/00* | (2015.01) |
| *B33Y 50/02* | (2015.01) |

(52) U.S. Cl.
CPC .......... *B23K 26/0006* (2013.01); *B23K 26/03* (2013.01); *B23K 26/0604* (2013.01); *B23K 26/0665* (2013.01); *B23K 26/342* (2015.10); *B33Y 10/00* (2014.12); *B33Y 30/00* (2014.12); *B33Y 50/02* (2014.12)

(58) Field of Classification Search
CPC .. B33Y 50/02; B23K 26/342; B23K 26/0006; B23K 26/03; B23K 26/0604; B23K 26/0665; B29C 64/10; B29C 64/135; B29C 64/171; B29C 64/188; B29C 64/264; B29C 64/268; B29C 64/277
See application file for complete search history.

(56) References Cited

U.S. PATENT DOCUMENTS

| | | | |
|---|---|---|---|
| 10,399,183 B2 | 9/2019 | Dallarosa et al. | |
| 2008/0314878 A1* | 12/2008 | Cai | B22F 10/80 |
| | | | 700/67 |
| 2014/0377586 A1* | 12/2014 | Van De Sanden | B23K 35/3033 |
| | | | 384/445 |

| | | | |
|---|---|---|---|
| 2016/0114431 A1* | 4/2016 | Cheverton | B22F 10/31 |
| | | | 219/76.1 |
| 2016/0158889 A1 | 6/2016 | Carter et al. | |
| 2016/0368050 A1 | 12/2016 | Morris et al. | |
| 2017/0021455 A1 | 1/2017 | Dallarosa et al. | |
| 2017/0056975 A1 | 3/2017 | Carter et al. | |
| 2017/0106447 A1 | 4/2017 | Ishida et al. | |
| 2017/0197248 A1* | 7/2017 | Giulietti | B22F 12/90 |
| 2018/0200792 A1 | 7/2018 | Redding et al. | |
| 2018/0207722 A1 | 7/2018 | Feldmann et al. | |
| 2018/0236549 A1 | 8/2018 | Spears et al. | |
| 2019/0004079 A1 | 1/2019 | Blom et al. | |
| 2019/0143406 A1 | 5/2019 | Carter et al. | |
| 2019/0160539 A1 | 5/2019 | Lei et al. | |
| 2019/0270254 A1* | 9/2019 | Mark | B29C 64/118 |
| 2019/0275585 A1* | 9/2019 | Akram | B22F 1/10 |
| 2019/0299286 A1 | 10/2019 | Feldmann et al. | |
| 2020/0004225 A1* | 1/2020 | Buller | B22F 5/04 |
| 2020/0016824 A1 | 1/2020 | Korol et al. | |
| 2020/0039000 A1 | 2/2020 | Sweetland | |
| 2020/0108465 A1 | 4/2020 | Sweetland | |
| 2020/0230745 A1 | 7/2020 | Komsta et al. | |
| 2020/0306883 A1* | 10/2020 | Wilson | B23K 26/0665 |
| 2020/0376761 A1 | 12/2020 | Sweetland | |
| 2021/0339318 A1 | 11/2021 | Dunbar et al. | |
| 2022/0009030 A1 | 1/2022 | Dadelszen et al. | |
| 2023/0056367 A1 | 2/2023 | Leonardo et al. | |

OTHER PUBLICATIONS

An Overview of Direct Laser Deposition for Additive Manufacturing Scott M. Thompson Additive Manufacturing, vol. Oct. 8, 2015, pp. 36-62 (Year: 2015).*
International Search Report and Written Opinion for International Application No. PCT/US2021/020593, mailed May 20, 2021.

* cited by examiner

MELT POOL CONTROL IN ADDITIVE MANUFACTURING SYSTEMS

CROSS-REFERENCE TO RELATED APPLICATIONS

This application claims the benefit under 35 U.S.C. § 119(e) of U.S. provisional application Ser. No. 63/018,542, filed May 1, 2020, the disclosure of which is incorporated by reference in its entirety.

FIELD

Disclosed embodiments are related to systems and methods for additive manufacturing.

BACKGROUND

Powder bed fusion processes are an example of additive manufacturing processes in which a three-dimensional shape is formed by selectively joining material in a layer-by-layer process. In metal powder bed fusion processes, one or more laser beams are scanned over a thin layer of metal powder. If the various laser parameters, such as laser power, laser spot size, and/or laser scanning speed are in a regime in which the delivered energy is sufficient to melt the particles of metal powder, one or more melt pools may be established on a build surface. The laser beams are scanned along predefined trajectories such that solidified melt pool tracks create shapes corresponding to a two-dimensional slice of a three-dimensional printed part. After completion of a layer, the powder surface is indexed by a defined distance, the next layer of powder is spread onto the build surface, and the laser scanning process is repeated. In many applications, the layer thickness and laser power density may be set to provide partial re-melting of an underlying layer and fusion of consecutive layers. The layer indexing and scanning is repeated multiple times until a desired three-dimensional shape is fabricated.

SUMMARY

In some embodiments, a method of controlling a weld height in an additive manufacturing process includes determining a desired melt pool width based, at least in part, on a desired weld height; selectively activating one or more laser energy sources based, at least in part, on the desired melt pool width; and melting a portion of a layer of material on a build surface via exposure to laser energy from the one or more activated laser energy sources to form a melt pool on the build surface having the desired melt pool width.

In some embodiments, an additive manufacturing system includes a build surface, a plurality of laser energy sources, and a laser control system operatively coupled to the plurality of laser energy sources. The laser control system is configured to determine a desired melt pool width based, at least in part, on a desired weld height and selectively activate one or more laser energy sources of the plurality of laser energy sources based, at least in part, on the desired melt pool width. Exposure of a portion of a layer of material on the build surface to laser energy from the one or more activated laser energy sources melts the portion of the layer of material to form a melt pool having the desired melt pool width.

In another embodiment, an additive manufacturing system including a build surface, a plurality of laser energy sources, and a processor operatively coupled to the plurality of laser energy sources. The processor is configured to selectively activate the plurality of laser energy sources to form a plurality of melt pools on the build surface that are staggered along a direction of travel of laser beams emitted by the plurality of laser energy sources relative to the build surface, where the plurality of melt pools include at least one leading melt pool and at least one trailing melt pool.

In yet another embodiment, an additive manufacturing method includes: selectively activating a plurality of laser energy sources to melt a portion of a layer of material on a build surface via exposure to laser energy to from a plurality of melt pools on the build surface that are staggered along a direction of travel of laser beams emitted by the plurality of laser energy sources relative to the build surface. The plurality of melt pools include at least one leading melt pool and at least one trailing melt pool.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figures 1A, 1B, 1C:
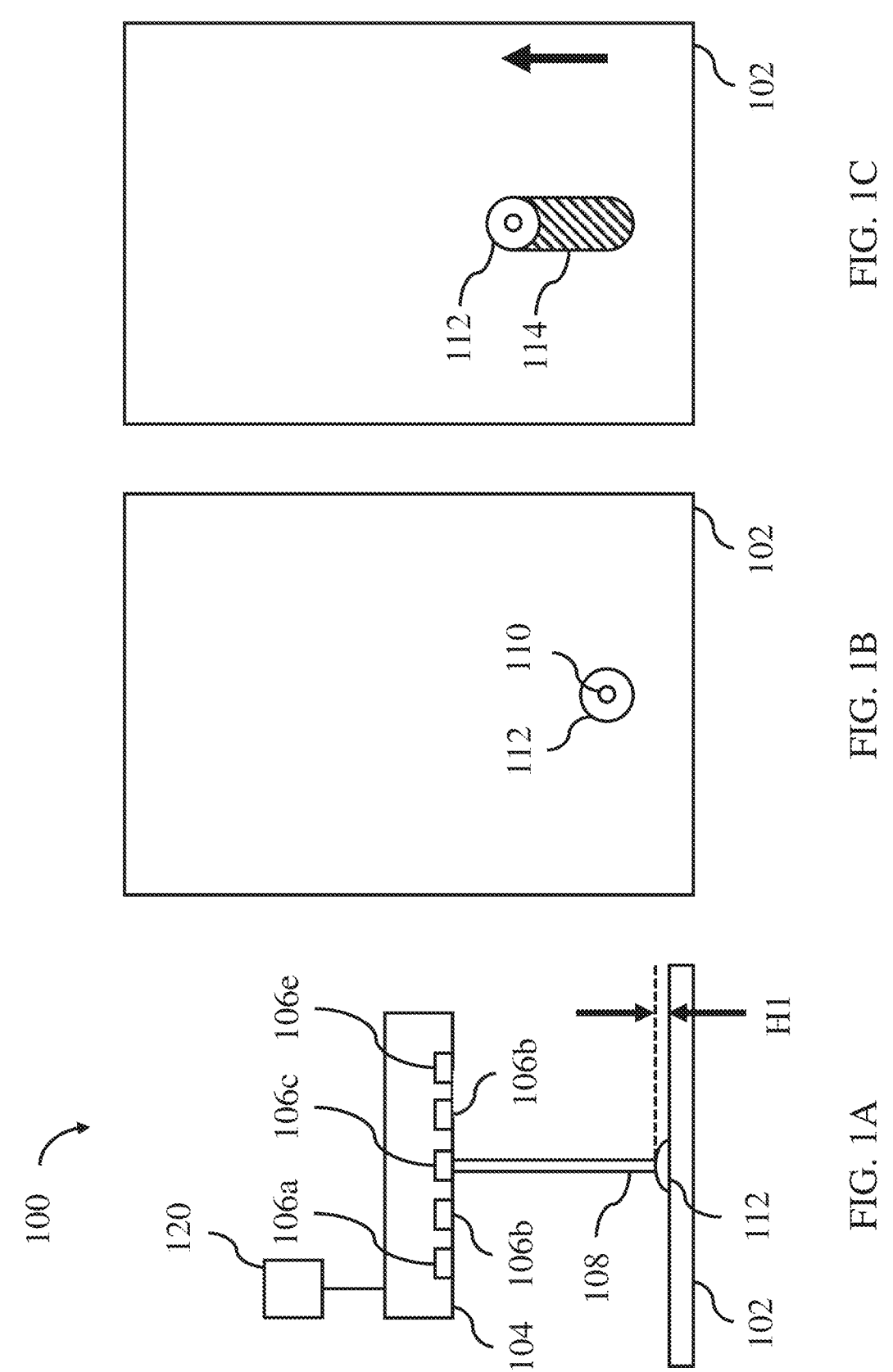
FIG. 1A is a front view of one embodiment of a single laser beam forming a single melt pool.
FIG. 1B is a top view of the embodiment of a single laser beam forming a single melt pool shown in FIG. 1A.
FIG. 1C is a top view of the embodiment of a single melt pool shown in FIG. 1B after translating the laser beam.

Some additive manufacturing processes, such as powder bed fusion processes, use laser beams to melt metal powder, forming one or more melt pools. The size of a melt pool may be determined in part by the amount of energy delivered by the laser beam to the metal powder. The amount of energy delivered may be dependent on a number of factors, such as the number of activated lasers, the laser power, the dwell time and/or translation speed, the pulse rate, and the focus of the one or more lasers used to melt the metal powder.

Without wishing to be bound by theory, delivering more energy and/or delivering energy to a larger area of bed of metal powder may be associated with forming a larger melt pool. A larger melt pool may be desirable in that a larger melt pool may enable faster processing of powder, which may enable a faster build speed and a shorter overall build time. One approach to increase the size of a melt pool may be to increase the size of an area one or more laser sources are applied to in order to fuse more material in a given amount of time. As the melt pool grows in width (i.e., in the direction perpendicular to the direction of travel of the laser beam(s)), more material may be processed and overall build speed may be increased. There are, however, challenges associated with larger melt pools. Due in part to the surface tension of the liquefied metal powder, the melt pool surface may form a liquid meniscus on the build surface. Without wishing to be bound by theory, the height of a melt pool may be a function of the width of the melt pool in addition to other parameters such as surface tension, contact angle, hydro-phobicity, build surface roughness, and others. Due to the melt pool height being at least partly determined by the melt pool width, substantially increasing the melt pool width may increase the melt pool height. Further, a melt pool that is taller than desired may solidify to form a weld that is taller than desired (although the height of the melt pool and the height of the weld need not be the same) and/or predicted.

In cases in which the actual layer height is different than the desired and/or predicted layer height, complications may result. For instance, a layer height that is greater than a desired and/or predicted layer height may interfere with a recoater operation that spreads new powder on a build surface between laser processing steps. A recoater blade may be set to a particular height relative to the previous layer based on an expected height of the previous layer. If a feature from a previous layer is too tall, the recoater blade may collide with that feature during the recoating operation, potentially damaging the recoater blade, damaging the part, or compromising alignment of the additive manufacturing system, among other potential negative consequences. A layer with features that are undesirably tall may also com-promise the fidelity of the next layer. If a layer is taller than expected, the extra height of the layer may occupy some of the space reserved for the metal powder of the next layer. With less powder than expected available for the next layer, print parameters may no longer be appropriate, and the next layer may be of poor quality. Additionally, a large melt pool may be undesirable for other reasons as well. For example, a large melt pool may cause material advection, in which powder in the area surrounding a melt pool is pulled into the melt pool. Such advection may result in insufficient material for fusion in the surrounding areas, which may potentially lead to voids or other defects in the final part.

In view of the above challenges, the inventors have recognized and appreciated the benefits of controlling melt pool width and/or forming multiple separate melt pools on a build surface. In some embodiments, a method of control-ling a weld height in an additive manufacturing process may begin with determining a desired melt pool width. As described above, a melt pool width may be associated with a melt pool height. As a melt pool cools and solidifies, the resulting weld may have a height associated with the height of the melt pool. As such, determining a desired melt pool width may be based, at least in part, on a desired weld and/or melt pool height. Thus, in some embodiments, a processor of an additive manufacturing system may control operation of the system such that it determines a desired melt pool width based at least in part on a desired weld and/or melt pool height. This height may be determined for an entire layer, an entire part, different portions of a layer, and/or different layers of a part as the disclosure is not limited to the use of a single melt pool width. In either case, after determining the desired melt pool width, the processor may control one or more operating parameters to selectively activate one or more laser energy sources based on the desired melt pool width. This may include, in some embodiments, operating multiple laser energy sources to form multiple melt pools with the desired one or more melt pool widths. The activated one or more lasers may then melt a corresponding one or more portions of a layer of material present on the build surface the to form one or more spaced apart melt pools on the build surface with the one or more desired melt pool widths.

In one illustrative example, a method of controlling a weld height may include selectively activating one or more lasers based, at least in part, on a desired melt pool width. For instance, a laser array may include a linear arrangement of five lasers. If all five lasers were activated simultaneously, the resulting laser beams may transfer enough energy to different portions of powder on a corresponding build sur-face that five separate, spaced melt pools may form, but quickly combine and collapse into a single, large melt pool. If instead the first, third, and fifth lasers are activated, while the second and fourth lasers are not operated, the three resulting melt pools may be sufficiently spaced so as not to coalesce into a single, large melt pool. In this way, selective activation of a subset of lasers within an array of lasers may enable control over melt pool width and location such that the simultaneously formed melt pools are kept sufficiently spaced apart during weld formation to prevent the separate multiple melt pools from combining to form a single undesirably large melt pool.

In view of the above, a method of controlling a weld height may include melting a portion of a layer of material on a build surface via exposure to laser energy from the one or more activated laser energy sources, thereby forming a melt pool on the build surface having the desired melt pool width. In some embodiments, multiple melt pools may be formed, each of which may have a different desired melt pool width. Of course, in some embodiments each melt pool may have the same desired melt pool width, as the disclosure is not limited in this regard. Thus, the resulting melt pools may either have the same or different heights depending on the desired pattern to be formed on a build surface. Further, the melt pool widths and corresponding weld heights may be the same along a single track, or the melt pool width and weld height may be dynamically changed along a length of a weld track as the disclosure is not limited in this fashion.

Without wishing to be bound by theory, a height of a melt pool may depend on a number of parameters. As described above, melt pool height may be related to melt pool width, due in part to the surface tension of the liquid melt pool. Additional parameters that may in part determine a relationship between melt pool width and melt pool height include, but are not limited to: powder material (whether metal or another material), material density, material temperature, build surface temperature, build surface roughness, build surface material, chemical properties of the build surface, the presence or absence of surfactants or other compounds, and others.

A width of a melt pool may be controlled in a number of ways taking into account one or more of the above relationships. In some embodiments, a melt pool width may be controlled by controlling an amount of energy delivered to and/or removed from the melt pool. The amount of energy delivered to a melt pool may depend, at least in part, on parameters such as the number of activated lasers, the laser power(s), the dwell time(s) and/or translation speed(s) of the laser(s), the pulse rate(s) of the laser(s), and the focus of the laser(s), among others. In some embodiments, a translation speed of a laser may refer to a rate at which a laser beam is scanned over a build surface. Without wishing to be bound by theory, a faster translation speed may be associated with a smaller amount of energy delivered to a particular portion of powder, which may be associated with a smaller melt pool. In some embodiments, a focus of a laser may be adjusted to, for example, change a depth of focus of the laser, which may include focusing a laser and/or defocusing a laser. Changing a focus of a laser may change a laser spot size, which may change the spatial power density of a laser beam on a build surface. For example, defocusing a laser on a build surface may be related to a larger laser spot size, which may be related to a lower spatial power density. Conversely, focusing a laser on a build surface may be related to a smaller laser spot size, which may be related to a higher spatial power density. In embodiments with multiple lasers in an array, changing a focus of one or more lasers of the array may change the spacing between laser spots, and may, in some embodiments, be associated with some degree of overlap between laser spots. An amount of energy removed from a melt pool may be adjusted through active cooling, for example. Of course, the amount of energy delivered to and/or removed from the melt pool may be controlled through other parameters and/or processes as the disclosure is not limited in this regard.

In addition to controlling an amount of energy delivered to and/or removed from a melt pool, a melt pool width may be controlled in other manners as well. In some embodiments, a melt pool width may be controlled by controlling a hydrostatic pressure within a build volume; material parameters such as powder material (whether metal or another material), material density, material temperature, and others; build surface temperature; build surface roughness; build surface material; chemical properties of the build surface; the presence or absence of surfactants or other compounds; and other appropriate operating parameters of the system.

Regardless of how a melt pool width is controlled, and regardless of whether a melt pool width is controlled using one or a combination of the above-mentioned means (or any other suitable means), a melt pool width may, in some embodiments, be controlled dynamically and/or continuously adjusted within a given layer. That is, as a laser traces a path across a build surface, one or more parameters may be altered to change a melt pool width as noted above. For example, a laser translation speed may be decreased or stopped completely to deliver more laser energy to a particular area of a build surface, thereby increasing a width of the melt pool. Alternatively, a laser focus may be dynamically adjusted as a laser beam moves across a build surface to adjust melt pool size. Due in part to the ability to dynamically adjust melt pool width within a single layer, a single layer may include features with different weld heights and/or different layers may be formed with different weld heights.

In some embodiments, it may be desirable to form a portion of a layer with a given width larger than a width of a single laser beam, using for example the methods noted above. However, for large features, processing enough material to make such a feature with a single melt pool may result in a wide melt pool width with a correspondingly undesirable melt pool height. Instead, the inventors have recognized and appreciated the benefits of forming multiple, spaced apart melt pools with one or more desired widths (and corresponding heights) that may form parallel welds during a pass of the laser beams of a laser array across the build surface. Depending on the particular embodiment, the remaining unfused portions of metal powder remaining between the separate melt pools and solidified welds may be melted either during a subsequent pass of the laser array and/or by one or more trailing lasers of the laser array that may melt the desired material disposed between two subsequently formed welds, i.e. after the leading melt pools have solidified. In this way, the material may be processed quickly and efficiently without compromising layer height accuracy or part fidelity.

In one illustrative example, an additive manufacturing process may include forming multiple spaced melt pools on a build surface. For example, a laser array of an additive manufacturing system may include a linear array of five lasers. On a first pass of laser beams across a build surface, only the first, third, and fifth lasers may be activated, resulting in three melt pools that may be sufficiently spaced so as not to coalesce into a single, large melt pool. On a second pass, the intervening lasers in the linear array (i.e., the second and fourth lasers) may be activated, and the first, third, and fifth lasers may be deactivated. The melt pools formed on the first pass may solidify into welds before the melt pools associated with the second pass are formed, or before the melt pools associated with the second pass come into the vicinity of the location on the build surface at which the melt pools associated with the first pass were formed.

As an alternative to activating different lasers on different passes, a position of a laser array on a second pass may be adjusted relative to a first pass. For example, the laser array may be shifted in a direction perpendicular to the direction of travel of the laser array by a distance corresponding to the spacing between the lasers. On the first pass, the first, third, and fifth lasers may be activated, as above. On the second pass, the laser array may be shifted (so that the first and third lasers are located on the second pass in the positions of the second and fourth lasers on the first pass), and the first and third lasers may be activated to process the material between the three welds formed on the first pass. It should be appreciated that a laser array may be adjusted, shifted, or offset in any direction. It should also be appreciated that a laser array may be adjusted, shifted, or offset by any suitable amount.

In some embodiments, a laser array may include two or more linear arrangements of lasers, which may be parallel, and which may be offset or staggered from one another. For example, a first linear arrangement of lasers may include two or more lasers spaced in a direction perpendicular to a direction of travel of the laser array, and a second linear arrangement of lasers located behind the first group of lasers relative to a direction of travel of the laser array may include two or more lasers spaced in the direction perpendicular to the direction of travel of the laser array such that the first and second groups of lasers are capable of forming parallel adjacent welds on the build surface without gaps between the adjacent welds. Relative to a direction of travel of the laser array, the first linear arrangement of lasers may be a "leading" line of lasers, and the second linear arrangement of lasers may be a "trailing" line of lasers. By controlling the amount of energy delivered to the build surface and relative speed of the laser array to the build surface, melt pools formed by the leading line of lasers may cool and solidify into welds before melt pools formed by the trailing line of lasers reach the same relative location on a build surface due to the trailing lasers being spaced behind the leading lasers relative to the direction of travel. Consequently, by spacing laser lines in a direction of travel of the laser lines across a build surface, multiple spaced portions of a layer and the intervening portions between the spaced portions may be processed quickly in either a single, or at least fewer passes, as compared to a typical laser array.

Depending on the particular embodiment, the lasers of an additive manufacturing system may be arranged in any suitable pattern, as the disclosure is not limited in this regard. In some embodiments, the lasers may be arranged in a linear pattern. In other embodiments, the lasers may be arranged in an array. An array of lasers may include a rectangular array, a hexagonal array, a circular array, or any other suitable type of array. In some embodiments, lasers may be arranged in multiple, substantially parallel lines. In such embodiments, each line of lasers may include lasers that are offset from lasers in an adjacent row of lasers. For example, a first line of lasers may include lasers at positions one, three, and five, and a second line of lasers may include lasers at positions two and four. Such an arrangement of lasers in subsequent rows offset from each other may be referred to as "staggered". Of course, other arrangements of lasers are possible as the disclosure is not limited in this regard.

It should be appreciated that lasers of a laser array may be spaced by any suitable amount. In some embodiments, adjacent lasers may be extremely close together, such that laser spots on a build surface formed by adjacent lasers may be close, touch, or overlap. In some embodiments, adjacent lasers may be spaced apart, such that laser spots on a build surface formed by the adjacent lasers may also be spaced apart. Embodiments in which lasers and/or groups of lasers are spaced apart may be preferable, in some cases, compared to embodiments in which lasers are densely packed together in an array because fewer lasers may be used to achieve a similar effect, especially if only a subset of lasers in a densely packed array of lasers are ever activated at a single time. Often, lasers can be a major cost driver, so a system with fewer overall lasers may enable a lower cost system.

In some embodiments, a single line laser source may be gated such that the resultant laser beams on the build surface may be spaced, yielding spaced melt pools that do not intersect. The gating of the laser source may be accomplished either through physical obscuration, through optical means, or through a combination of physical and optical means. For example, one or more laser sources may be split or bent such that multiple laser beams are produced on a build surface with sufficient spacing to avoid the joining of melt pools formed by those laser beams.

In some embodiments, an additive manufacturing system includes a build surface and a plurality of laser energy sources. The build surface may be a build plate, a previously processed layer of a part being fabricated, or any other appropriate surface upon which an additive manufacturing process may occur. The plurality of laser energy sources (also described herein as "lasers") may emit laser energy (also described herein as "laser beams") from an additive manufacturing system.

In some embodiments, the laser array may emit laser beams at a predefined angle relative to the laser array. In such embodiments, a laser beam may trace a path on the build surface due to relative motion of the laser array and the build surface. The relative motion may be due to motion of the laser array relative to a stationary build surface, motion of a build surface relative to a stationary laser array, or motion of both the laser array and the build surface relative to a fixed external reference point, as the disclosure is not limited in this regard. In such an embodiment, the laser array may be integrated into an optics head. In other embodiments, both the laser array and the build surface may remain stationary relative to one another, and the angle of the laser beams relative to the laser array may be dynamically adjusted to trace a path on the build surface using any appropriate control method. In such embodiments, one or more optical components, such as a laser galvanometer, solid state scanning, or any other appropriate component capable of controlling the relative motion of a laser beam on a build surface may be used. In yet other embodiments, a combination of the above control methods may be used. Accordingly, it should be appreciated that any suitable method of controlling the relative motion of the one or more laser beams over a build surface may be used as the disclosure is not limited in this regard.

It should be appreciated that while a laser beam may be emitted as part of a laser array, a laser energy source may be in any suitable location. In some embodiments, a laser energy source may be disposed in or on an optics head. In some embodiments, a laser energy source may be disposed at another portion of an additive manufacturing system. In some embodiments, a laser energy source may be removed from an additive manufacturing system, and may be coupled to an optics assembly through optical elements including fiber optic cables, mirrors, lenses, and any other appropriate optical elements, as the disclosure is not limited in this regard.

In some embodiments, an additive manufacturing system includes a laser control system, which may include one or more processors and associated memory that includes processor executable instructions stored in an appropriate non-transitory processor readable medium. When the processor executable instructions are executed by the processor, the processor may control one or more operations of the additive manufacturing system to perform any one of the processes and methods described herein. The control system may be coupled to the lasers through any appropriate connection including wires, cables, wireless connections, and the like. It should be appreciated that a control system may be disposed in any suitable location, whether on the laser array, in a separate portion of the additive manufacturing system, or at a location removed from the additive manufacturing system, as the disclosure is not limited in this regard. The control system may also be configured to control lasers of an additive manufacturing system to form melt pools of a desired width to control a weld height as described herein.

In some embodiments, an aspect ratio of a melt pool may include a ratio of a melt pool height to a melt pool width. In some embodiments, an aspect ratio of a melt pool may include a ratio of a melt pool width to a melt pool height. Depending on the particular embodiment, a ratio of the melt pool height to the melt pool width during operation of an additive manufacturing system may be greater than or equal to 0.08, 0.1, 1, 10, 20 or any other appropriate ratio. The ratio of the melt pool height to the melt pool width may also be less than or equal to 100, 80, 60, 40, 20, 10, or any other appropriate ratio. Combinations of these ranges are contemplated including, for example, a ratio of the melt pool height to the melt pool width between or equal to 0.08 and 100. Of course ratios both greater and less than these ranges are also contemplated as the disclosure is not limited in this fashion. Further, without wishing to be bound by theory, in some embodiments, a melt pool aspect ratio may scale linearly with the size of the melt pool.

In some embodiments, a layer thickness of an additive manufacturing process may be greater than or equal to 1 μm, 2 μm, 5 μm, 10 μm, 20 μm, 50 μm, 100 μm, 200 μm, or 500 μm. In some embodiments, a layer thickness of an additive manufacturing process may be less than or equal to 1000 μm, 500 μm, 200 μm, 100 μm, 50 μm, 20 μm, 10 μm, 5 μm, or 2 μm. Combinations of the above noted ranges are contemplated including, for example, a layer thickness between or equal to 1 μm and 1000 μm. Other suitable layer thicknesses both greater and less than those noted above are contemplated as the disclosure is not limited in this regard.

In some embodiments, a width of a melt pool of an additive manufacturing process may be greater than or equal to 5 μm, 10 μm, 20 μm, 50 μm, 100 μm, 200 μm, 500 μm, 1000 μm, or 2000 μm. In some embodiments, a width of a melt pool of an additive manufacturing process may be less than or equal to 5000 μm, 2000 μm, 1000 μm, 500 μm, 200 μm, 100 μm, 50 μm, 20 μm, or 10 μm. Combinations of the above noted ranges are contemplated including, for example, a width of a melt pool that is between or equal to 5 μm and 5000 μm. Other suitable melt pool widths both greater and less than those noted above are contemplated as the disclosure is not limited in this regard.

In some embodiments, a height of a melt pool of an additive manufacturing process may be greater than or equal to 20 μm, 50 μm, 100 μm, 500 μm, 1 mm, or any other appropriate height. In some embodiments, a height of a melt pool of an additive manufacturing process may be less than or equal to 5 mm, 3 mm, 1 mm, 500 μm, 100 μm, or any other appropriate height. Combinations of the above noted ranges are contemplated including, for example, a height of a melt pool that is between or equal to 20 μm and 5 mm. Other suitable melt pool heights both greater and less than those noted above are contemplated as the disclosure is not limited in this regard.

In some embodiments, a width of a laser beam of an additive manufacturing process may be greater than or equal to 5 μm, 10 μm, 20 μm, 50 μm, 100 μm, 200 μm, or 500 μm. In some embodiments, a width of a laser beam of an additive manufacturing process may be less than or equal to 1000 μm, 500 μm, 200 μm, 100 μm, 50 μm, 20 μm, or 10 μm. Combinations of the above noted ranges are contemplated including, for example, a width of a laser beam that is between or equal to 5 μm and 1000 μm. Other suitable laser beam widths both greater than and less than those noted above are contemplated as the disclosure is not limited in this regard. In some embodiments, a width of a melt pool may depend, at least in part, on a width of a laser beam.

In some embodiments, a power output of a laser beam of an additive manufacturing process may be greater than or equal to 10 W, 100 W, 200 W, 500 W, or any other appropriate power. In some embodiments, a power output of a laser beam of an additive manufacturing process may be less than or equal to 1 kW, 500 W, 200 W, 100 W, or any other appropriate power. Combinations of the above noted ranges are contemplated including, for example, a power output that is between or equal to 10 W and 1 kW. Other suitable laser beam powers both greater than and less than those noted above are contemplated as the disclosure is not limited in this regard. In some embodiments, a width of a melt pool may depend, at least in part, on a power of a laser beam.

In some embodiments, a translation speed of a laser beam relative to a build surface of an additive manufacturing process may be greater than or equal to 10 mm/s, 100 mm/s, 500 mm/s, 1 m/s, or any other appropriate speed. In some embodiments, a translation speed of a laser beam of an additive manufacturing process may be less than or equal to 2 m/s, 1 m/s, 500 mm/s, 100 mm/s, or any other appropriate speed. Combinations of the above noted ranges are contemplated including, for example, a translation speed of a laser beam relative to a build surface that is between or equal to 10 mm/s and 2 m/s. Other suitable laser beam translation speeds both greater than and less than those noted above are contemplated as the disclosure is not limited in this regard. In some embodiments, a width of a melt pool may depend, at least in part, on a translation speed of a laser beam.

The preceding discussion examines questions related to how to prevent a melt pool from growing undesirably tall. Approaching this challenge from another direction, a relevant question may be how to intentionally grow a melt pool taller than a "standard" layer height. A taller melt pool may be associated with wider laser beams, which may be associated with faster builds and short build times. In this way, a tradeoff between part resolution and build time may be advantageously tuned to the specific demands of a given build. For example, if part resolution is determined to be of lesser concern than short build times for a particular operation, large melt pools may be formed intentionally to process more material at a higher speed. As long as the associated increase in height of the melt pool (and the associated increase in height of each layer) is taken into account, such a build strategy may be advantageous in certain situations.

Thus, as noted previously, a desired layer and/or melt pool height may be identified and a corresponding melt pool width to provide the desired layer and/or melt pool height may be determined. An additive manufacturing system may then be operated to implement a build pattern for a given layer using the desired melt pool widths using any desired combination of operating parameters and component operation as described herein. Thus, while for the sake of clarity, the methods described herein are primarily directed to the concept of controlling melt pool width based on a desired melt pool and/or weld height, in some embodiments, a desired melt pool width may be selected and the corresponding melt pool and/or weld height may be determined to control one or more operations of the system including setting a layer height, controlling a recoater operation based on the set layer height, an/or controlling any other desired operation as the disclosure is not limited in this fashion.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein. For the sake of clarity an optics head that is translated relative to a build surface has been illustrated in the figures. However, it should be understood that any appropriate system and/or control method may be used for translating the lasers of the depicted systems relative to the build surface as the disclosure is not limited to any particular method of controlling the motion of the laser beams over the build surface.

FIGS. 1A-1C show one embodiment of a single laser beam forming a single melt pool. In this embodiment, an additive manufacturing system 100 comprises a build surface 102, a laser array 104 including a plurality of lasers 106, and a processor 120 that is configured to control the various components of the additive manufacturing system to perform the described processes. After determining a desired melt pool width based, at least in part, on a desired weld height, the processor 120 selectively activates at least one laser 106c, which in this embodiment is a single laser. The laser 106c emits a laser beam 108, which melts a portion of a layer of material (not shown) on the build surface 102, forming a melt pool 112 having the desired melt pool width. The melt pool 112 forms a liquid meniscus on the build surface 102. In some embodiments, the material within a melt pool may be fully liquid. As the melt pool cools and solidifies, the melt pool may transform into a weld. In some embodiments, a melt pool may include a mixture of liquid and solid material. The laser beam 108 then translates relative to the build surface 102, as shown in FIG. 1C. In this process, the melt pool 112 similarly translates, as new material is melted by the laser beam 108. As the melt pool 112 moves across the build surface 102, the trailing edge of the melt pool 112 solidifies, forming a weld 114 with the desired weld height.

When operating the laser array 104 and associated lasers 106, the processor 120 may control the laser power, the number of activated lasers, the laser array translation speed, the laser pulse rate, the focus of the one or more lasers, and/or any other appropriate operating parameter to provide the desired power to an area of the build surface 102 to form the melt pool 112 with the desired width. For example, faster translation speeds may be associated with larger laser powers as compared to slower translation speed to provide the same desired amount of energy to melt a given width of material on a build surface. These operating parameters may be determined by the processor in any appropriate method and may take into account appropriate material and/or system properties as described herein.

In some embodiments, a melt pool 112 may have a width that is different from the size of a laser spot 110. For example, as illustrated in the figure, the laser spot is incident on an first smaller area that provides sufficient energy to melt a surrounding larger area to form the melt pool width a desired overall width in a direction that is perpendicular to a direction of travel of the laser beam relative to the build surface 102 and parallel to the build surface. Separately, as noted previously, a height H1 of the melt pool 112 may depend on the width of the melt pool 112, due in part to surface tension effects. In some embodiments, a height of the weld 114 after the melt pool has solidified may be different from the height H1 of the melt pool 112. For instance, a height of the weld may be approximately equal to or less than a height of the melt pool depending on the particular material being fused. Thus, in some embodiments, a desired weld height for forming a printed pattern on a build surface may be used to determine a desired melt pool height and/or melt pool width and vice versa.

Figures 2A, 2B, 2C:
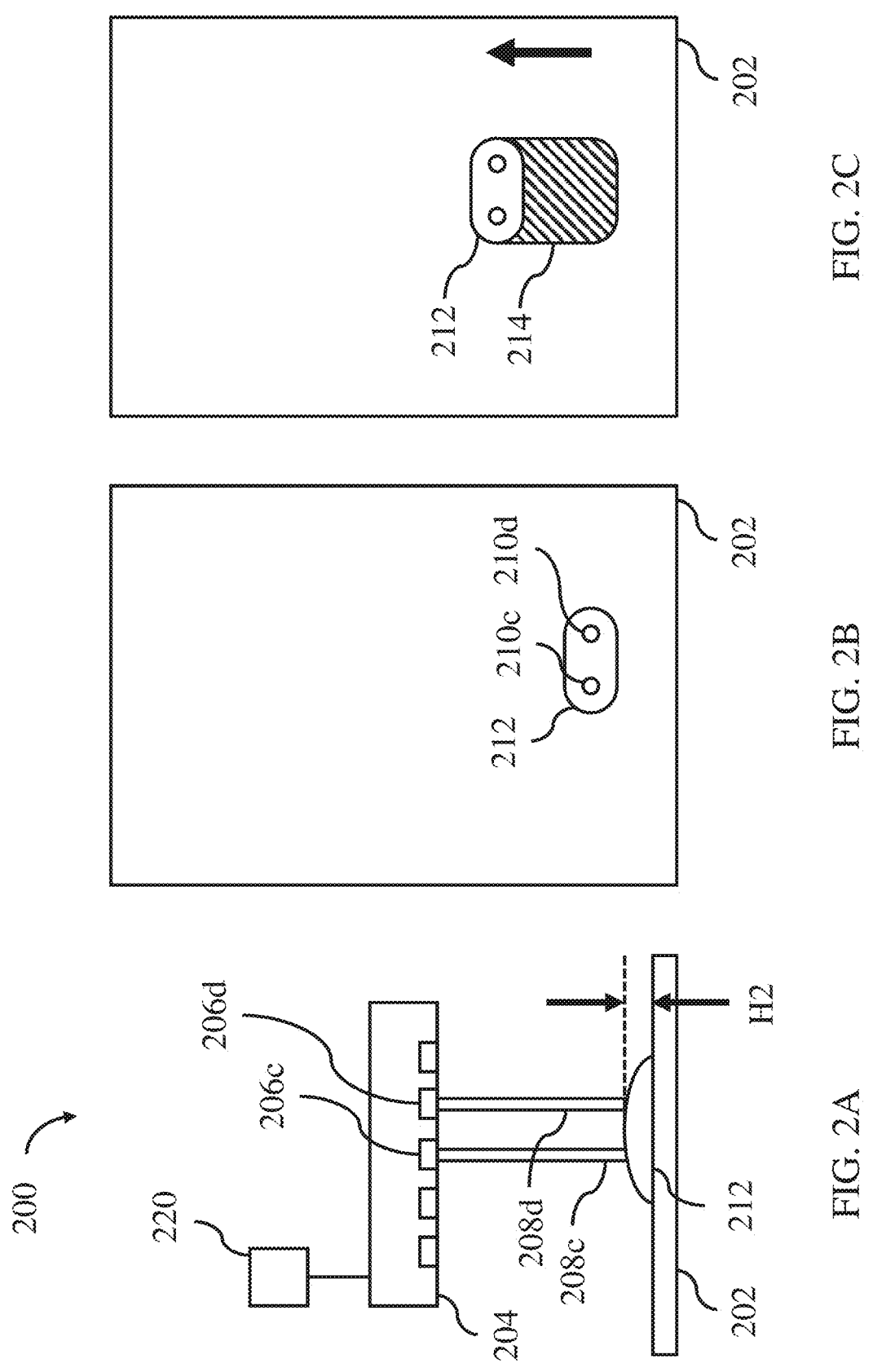
FIG. 2A is a front view of one embodiment of two laser beams forming a single melt pool.
FIG. 2B is a top view of the embodiment of two laser beams forming a single melt pool shown in FIG. 2A.
FIG. 2C is a top view of the embodiment of a single melt pool shown in FIG. 2B after translating the two laser beams.

As noted above, in addition to controlling the operating parameters of a single laser to control the width of a formed melt pool, in some embodiments, multiple lasers that provide energy to overlapping, adjacent, and/or sufficiently close regions of a build surface may be used to form a single melt pool with an increased width. Such an embodiment is illustrated in FIGS. 2A-2C which shows the operation of two adjacent laser beams forming a single melt pool. In this embodiment, an additive manufacturing system 200 comprises a build surface 202, a laser array 204 including a plurality of lasers 206, and a processor 220 that is configured to control the various components of the additive manufacturing system to perform the described processes. The processor 220 selectively activates two or more lasers 206c and 206d. Laser 206c emits a laser beam 208c, and laser 206d emits a laser beam 208d. Again, the lasers may either be directed onto overlapping or separated portions of the build surface. In the illustrated embodiment, each laser initially melts a separate portion of a layer of material (not shown) on the build surface 202, forming two separate melt pools. However, after a period of time, sufficient energy is transferred from the laser beams 208 to the material that the melt pools grow and coalesce into a single melt pool 212 with an increased width which may be controlled using any of the above noted operating parameters. This process may take place on the order of 1 μs-500 μs. Compared to a melt pool formed by a single laser beam, melt pool 212 may have a larger height H2, due at least in part to the larger width. The laser beams 208c and 208d may then be translated relative to the build surface 202, as shown in FIG. 2C. During translation of the laser beams relative to the build surface, the melt pool 212 similarly translates along the build surface as new material is melted by the laser beams 208. Correspondingly, as the melt pool 212 moves across the build surface 202, the trailing edge of the melt pool 212 cools and eventually solidifies forming a weld 214. Again, the weld may have a height that is equal to or less than the height H2 of the melt pool.

Figures 3A, 3B, 3C:
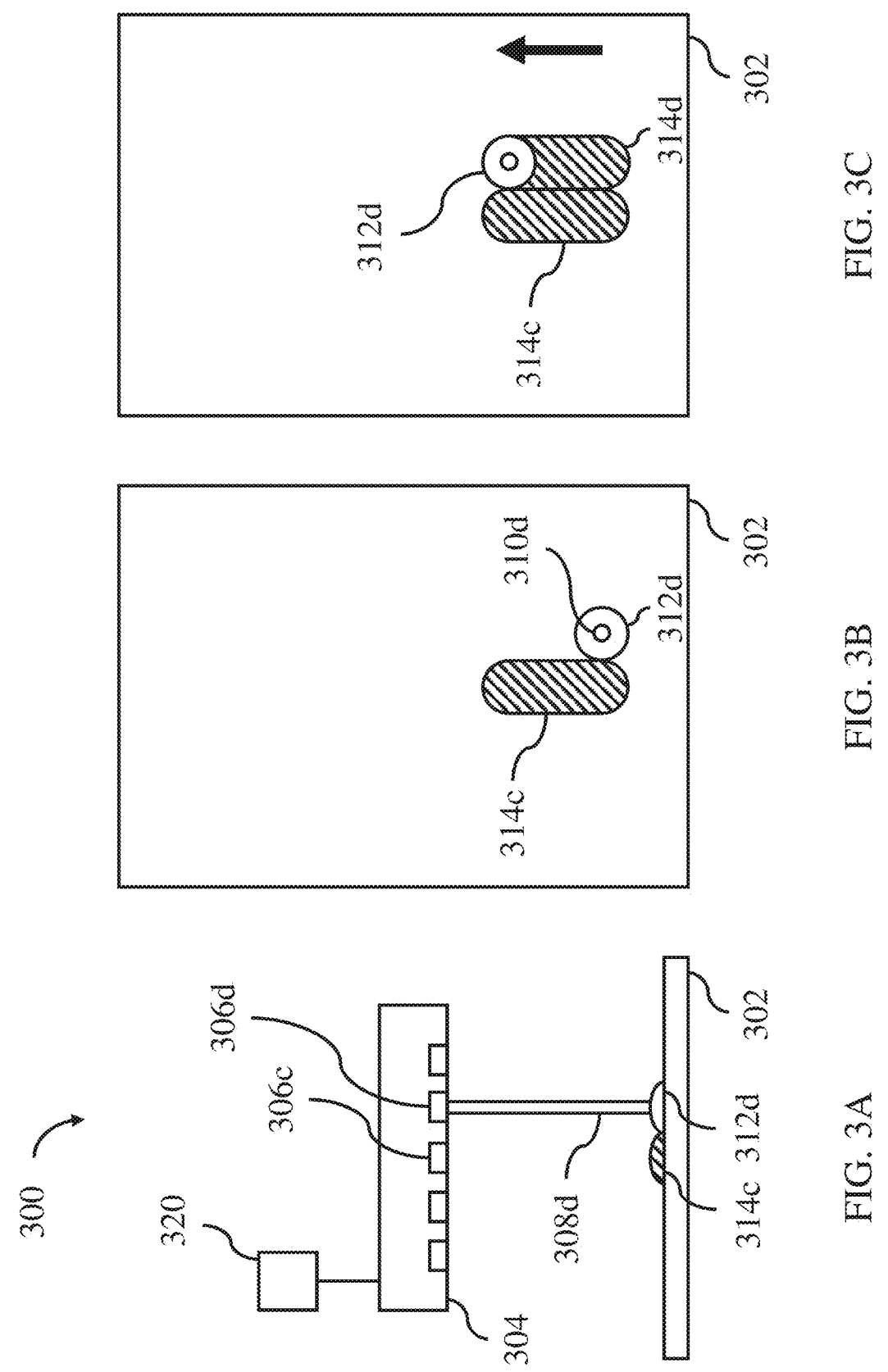
FIG. 3A is a front view of one embodiment of a single laser beam forming a melt pool adjacent a previously solidified melt pool.
FIG. 3B is a top view of the embodiment of a single laser beam forming a melt pool adjacent a previously solidified melt pool shown in FIG. 3A.
FIG. 3C is a top view of the embodiment of a melt pool adjacent a previously solidified melt pool shown in FIG. 3B after translating the laser beam.

FIGS. 3A-3C show one embodiment of a single laser beam forming a melt pool adjacent a previously solidified melt pool. In this embodiment, an additive manufacturing system 300 comprises a build surface 302, a laser array 304 including a plurality of lasers 306, and a processor 320 that is configured to control the various components of the additive manufacturing system to perform the described processes. As seen in the figure, a first weld 314c has already been created on the build surface. For example, weld 314c may have been created in a manner analogous to the creation of weld 114 described above in the discussion of FIGS. 1A-2C. After determining a desired melt pool width based, at least in part, on a desired weld height, the processor 320 selectively activates one or more lasers, such as laser 306d. The one or more resulting laser beams may then melt a portion of a layer of material (not shown) on the build surface 302, forming a melt pool 312d having the desired melt pool width. The laser beam 308d then translates relative to the build surface 302, as shown in FIG. 3C. In this process, the melt pool 312d similarly translates, as new material is melted by the laser beam 308d. As the melt pool 312d moves across the build surface 302, the trailing edge of the melt pool 312d solidifies forming a weld 314d. Weld 314d is adjacent to weld 314c, which was formed by a solidified melt pool formed by laser 306c on a prior pass of the laser array in the illustrated embodiment. In some embodiments, as the melt pool 312d is formed adjacent to and translate along a length of the previously formed weld 314c, portions of the prior weld 314c may melt and/or reflow. The specific amount or melting and/or reflow may depend at least in part on a relative spacing of the solidified weld 314c and the melt pool 312d as well as the amount of energy input to the melt pool. In some embodiments, after solidification of the melt pool, an interface between welds 314c and 314d may be continuous, resulting in a solidified feature with a substantially flat surface, not shown in the figures. However, while the melt pool, and resulting weld has been illustrated as being adjacent to the prior weld, in some embodiments, depending on the particular pattern being formed on a layer, the melt pool 312d may be spaced from the prior weld 314c such that the separate welds 314c and 314d do not merge and/or contact one another.

Figures 4A, 4B, 4C:
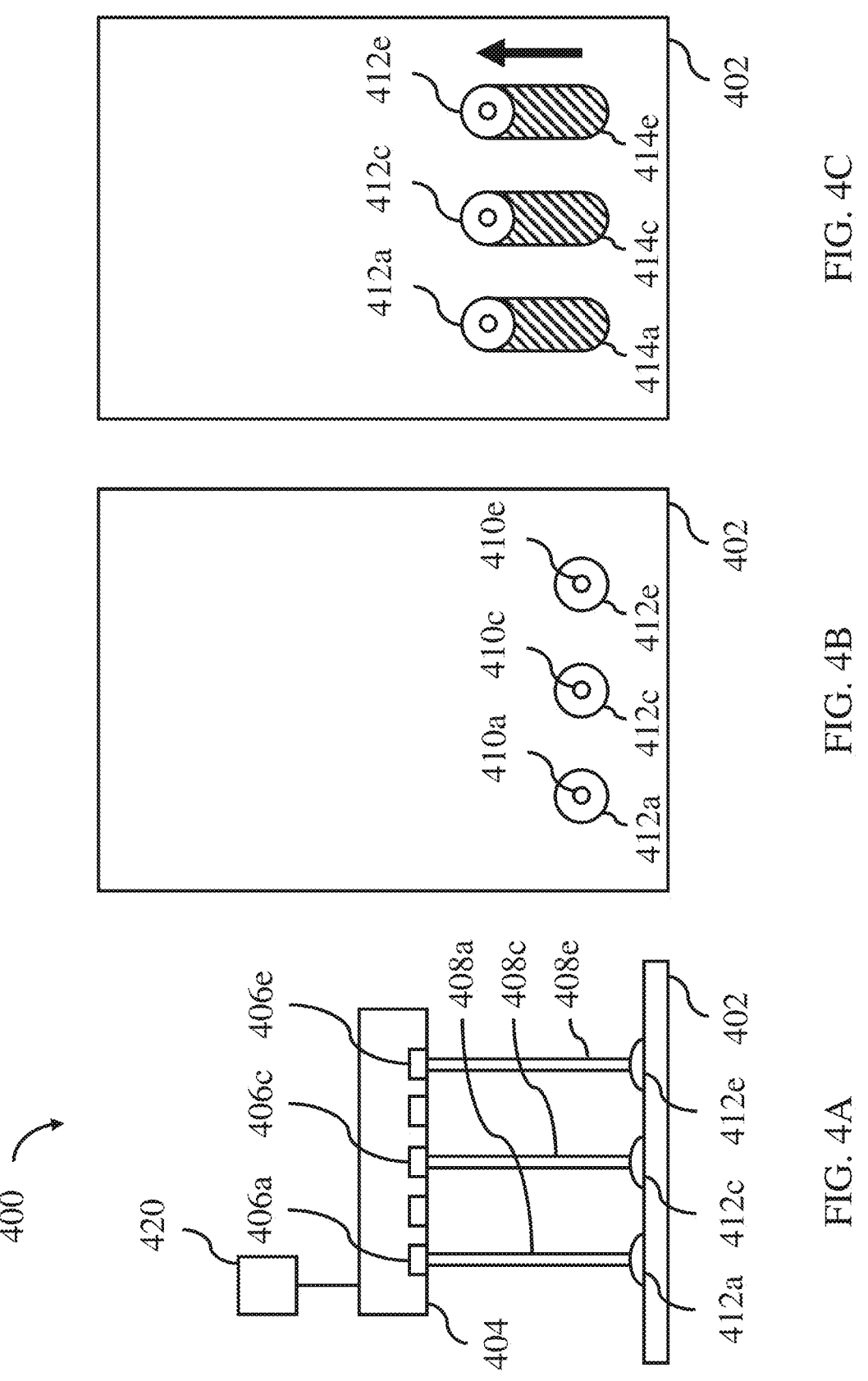
FIG. 4A is a front view of one embodiment of multiple spaced laser beams forming multiple, spaced melt pools.
FIG. 4B is a top view of the embodiment of multiple spaced laser beams forming multiple, spaced melt pools shown in FIG. 4A.
FIG. 4C is a top view of the embodiment of multiple spaced melt pools shown in FIG. 4B after translating the multiple spaced laser beams.

FIGS. 4A-4F show one embodiment of multiple laser beams being operated to forming multiple spaced apart melt pools on a build surface during a first pass, and subsequent formation of additional melt pools in the intervening spaces between the resulting welds during one or more additional scans. FIGS. 4A-4C show the first pass in which a first subset of lasers are activated to provide energy to separate spaced apart regions of the build surface. In this embodiment, an additive manufacturing system 400 comprises a build surface 402, a laser array 404 including a plurality of lasers 406, and a processor 420 that is configured to control the various components of the additive manufacturing system to perform the described processes. After determining a desired melt pool width based, at least in part, on a desired weld height, the processor 420 selectively activates a desired subset of lasers, such as lasers 406a, 406c, and 406e. The selected lasers then emit laser beams 408a, 408c, and 408e, or groups of laser beams, that provide energy to separate spaced apart regions of the build surface. The laser beams then melt different portions of a layer of material (not shown) on the build surface 402 to form multiple separate melt pools 412a, 412c, and 412e that are spaced apart from one another on the build surface. The laser beams 408 then translate relative to the build surface 402, as shown in FIG. 4C. In this process, the melt pools 412 similarly translate, as new material is melted by the laser beams 408. Correspondingly, as the melt pools 412 move across the build surface 402, the trailing edges of the melt pools 412 solidify, forming welds 414 with the desired weld height.

Figures 4D, 4E, 4F:
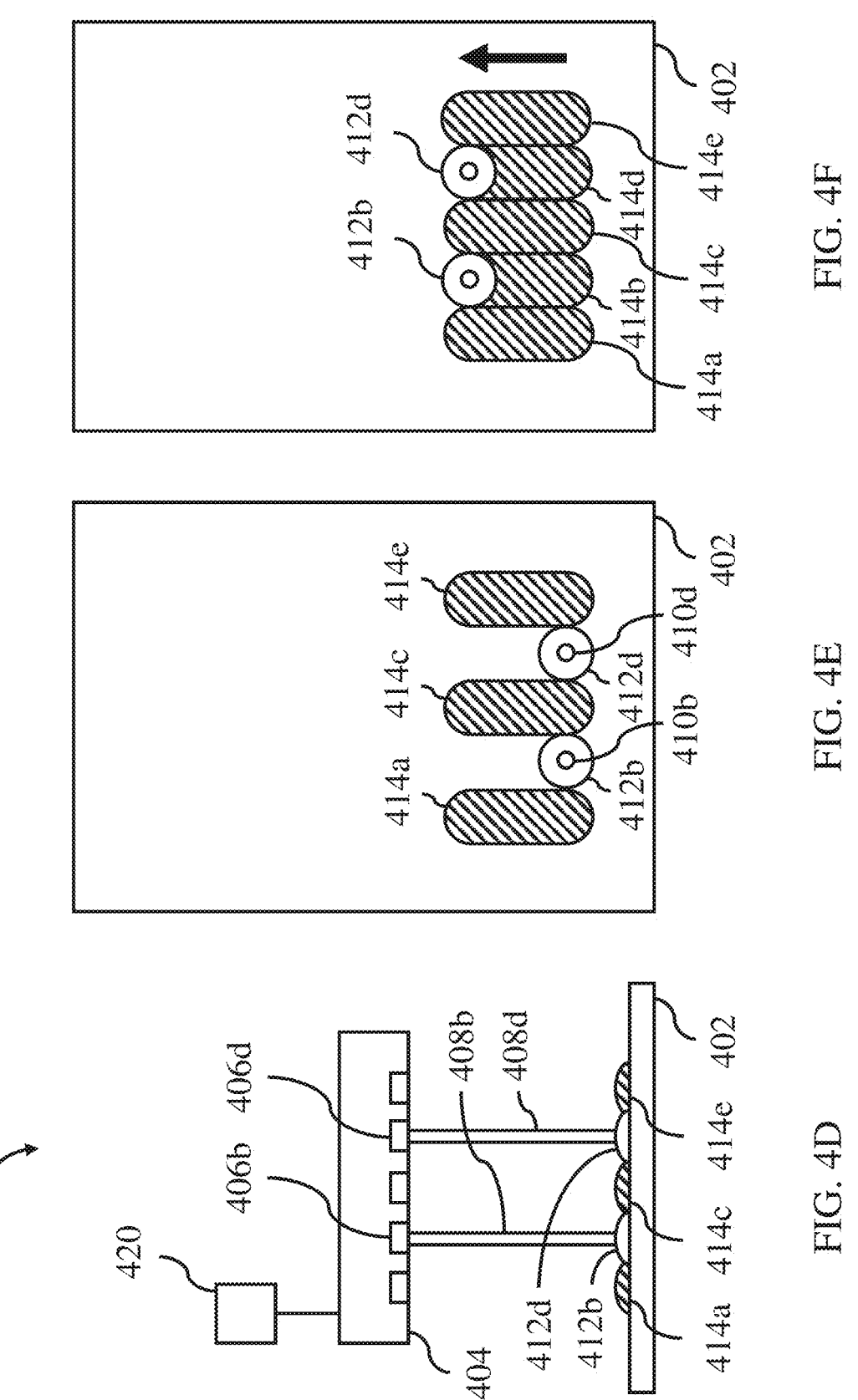
FIG. 4D is a front view of the embodiment of multiple spaced laser beams forming multiple spaced melt pools shown in FIG. 4A during a second pass in which intermediate laser beams are activated.
FIG. 4E is a top view of the embodiment of multiple spaced laser beams forming multiple spaced melt pools during a second pass shown in FIG. 4D.
FIG. 4F is a top view of the embodiment of multiple spaced melt pools during a second pass shown in FIG. 4E after translating the multiple spaced laser beams.

FIGS. 4D-4F show a second pass of the laser array 404 in which a second subset of spaced laser beams are activated to form melt pools and corresponding welds in regions of the build surface adjacent to the previously formed welds. For example, in the depicted embodiment, welds 414a, 414c, and 414e were created on the first pass, as described above. After determining a desired melt pool width based, at least in part, on a desired weld height, the processor 420 selectively activates either individual lasers 406b and 406d as illustrated in the depicted embodiment, or groups of lasers. The resulting laser beams 408b and 408d are then incident upon separate regions of the build surface 402 located between previously formed welds. The laser beams melt the material present in these locations forming separate melt pools 412b and 412d that are disposed between the previously formed welds. The laser beams, or groups of laser beams, are then translated relative to the build surface 402 and along a length of the previously formed welds, as shown in FIG. 4C. In this process, the melt pools 412b and 412d similarly translate along a length of the previously formed welds such that the melt pools traverse along at least a portion of a length of these welds as new material is melted by the laser beams 408b and 408d. As the melt pools 412b and 412d move across the build surface 402, the trailing edges of the melt pools solidify forming welds 414b and 414d. As illustrated in the figures, the resulting welds 414b and 414d formed during the current pass are disposed between and extend along at least a portion of a length, and in some embodiments along an entire length, of the previously formed welds formed during the first or some other prior pass of the laser array. The various welds 414 may combine to various degrees, as described above in relation to FIGS. 3A-3C as the disclosure is not limited in this regard.

Figures 4G, 4H, 4I:
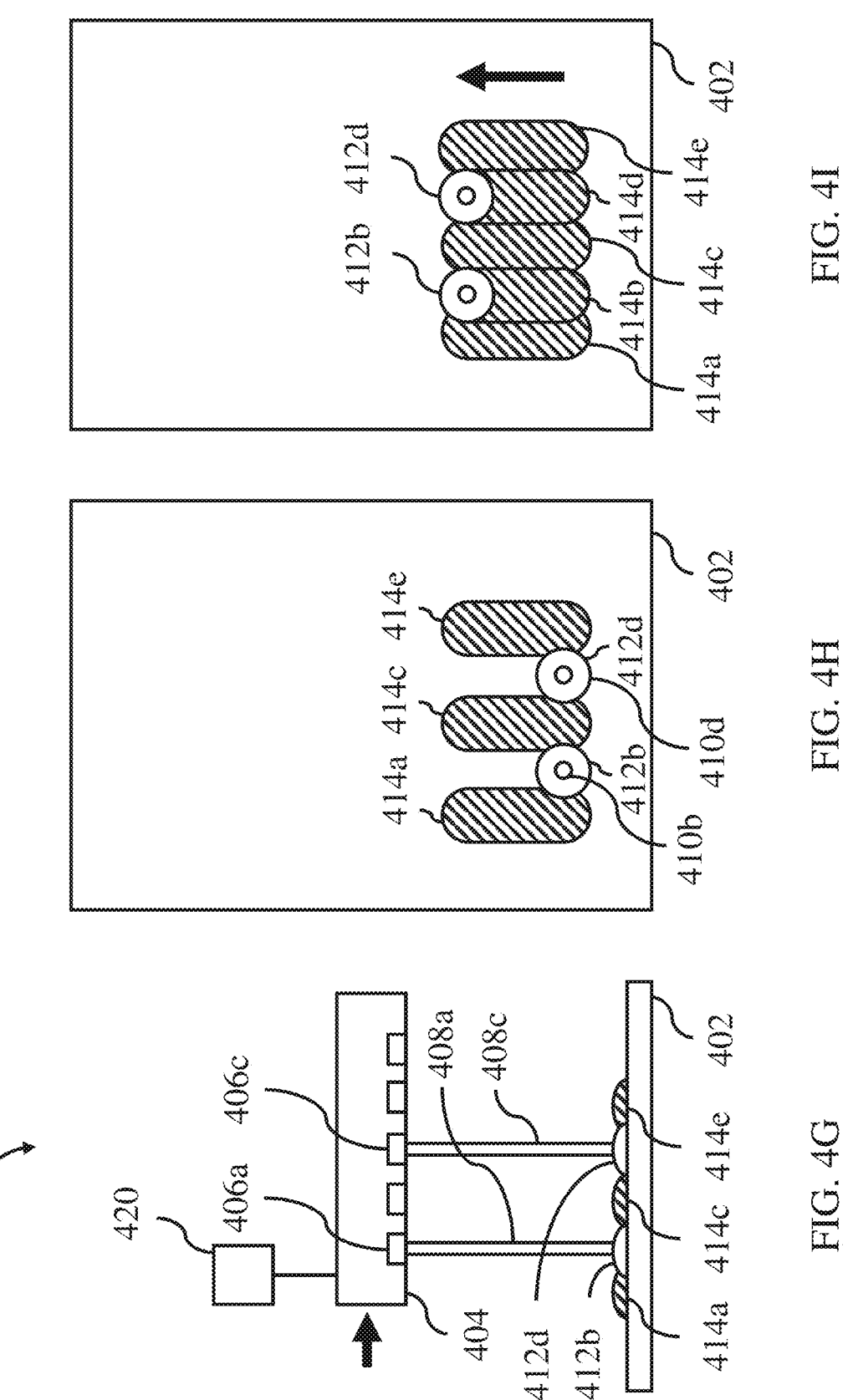
FIG. 4G is a front view of the embodiment of multiple spaced laser beams forming multiple spaced melt pools shown in FIG. 4A during a second pass in which the laser array has been adjusted in a direction perpendicular to the scan direction.
FIG. 4H is a top view of the embodiment of multiple spaced laser beams forming multiple spaced melt pools during a second pass shown in FIG. 4G.
FIG. 4I is a top view of the embodiment of multiple spaced melt pools during a second pass shown in FIG. 4H after translating the multiple spaced laser beam.

In some embodiments, a position of a laser array may be adjusted in a direction different from a scan direction. For example, the positions of the laser beams emitted by the laser array relative to the build surface may be adjusted in a direction perpendicular to a scan direction. Adjusting a laser array between a first pass and a second pass may enable a single laser to form two different welds during different passes. FIGS. 4G-4I show one such embodiment of this modification to the process previously shown in FIGS. 4D-4F multiple laser beams being operated to form multiple spaced apart melt pools on a build surface during a first pass. Specifically, FIGS. 4G-4I show a second pass of the laser array 404 after the laser array has been adjusted in a direction perpendicular to the scan direction. Again this may either be due to a translation of the array relative to the build surface and/or the lasers themselves may be steered to translate a position of the lasers in a direction perpendicular to a direction of translation of the laser beams 408a and 408c across the build surface. In this way, the melt pools formed on the second pass 412b and 412d may be made by the first and third lasers at positions that are offset from the welds made on the first pass which formed welds 414a, 414c, and 414e as shown previously in FIGS. 4A-4C. As indicated by the arrow in FIG. 4G, the laser array 404 may be offset by any appropriate distance. For example, the laser array 404 may be offset by a distance equal to a spacing between lasers 406. In this case, a second pass with lasers 406a, 406c activated may resemble a second pass with no offset with lasers 406b and 406d activated (similar to FIGS. 4D-4F). Alternatively, and as shown in FIGS. 4G-4I, the size of the previously formed welds 414a, 414c, and 414e may be sized and spaced such that the laser array 704 may be offset by a distance less than or greater than a spacing between the lasers and/or the previously formed weld pools. In this case, welds formed on the second pass 714b and 714d may at least partially overlap welds formed on the first pass. Overlapping welds may be desirable in that overlapping welds may promote a smooth top surface. Of course, depending at least in part on the spacing of the lasers and the relative laser powers, overlapping welds may be formed without adjusting the array in a direction different from the scan direction.

Figures 5A, 5B, 5C:
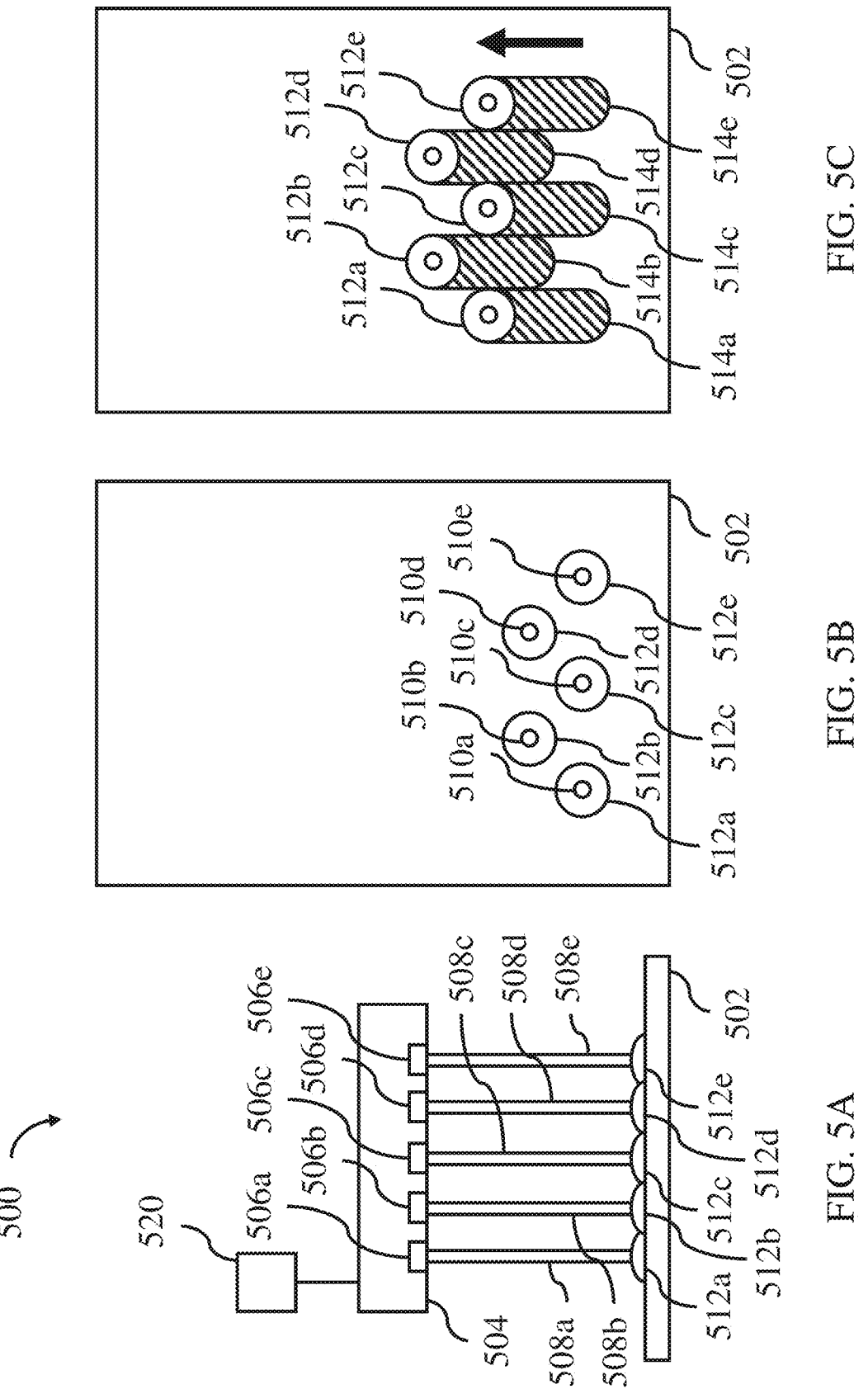
FIG. 5A is a front view of one embodiment of multiple laser beams spaced in a staggered array forming multiple spaced melt pools.
FIG. 5B is a top view of the embodiment of multiple laser beams spaced in a staggered array forming multiple spaced melt pools shown in FIG. 5A.
FIG. 5C is a top view of the embodiment of multiple spaced melt pools shown in FIG. 5B after translating the multiple laser beams spaced in a staggered array.

FIGS. 5A-5C show one embodiment of multiple laser beams spaced in a staggered array forming multiple, spaced melt pools. In this embodiment, an additive manufacturing system 500 comprises a build surface 502, a laser array 504 including a plurality of lasers 506, and a processor 520 that is configured to control the various components of the additive manufacturing system to perform the described processes. After determining a desired melt pool width based, at least in part, on a desired weld height, the processor 520 selectively activates lasers 506a, 506b, 506c, 506d, and 506e. In contrast to other embodiments in which lasers may be arranged substantially linearly, the lasers in this embodiment are arranged in an array. While the lasers have been shown as being spaced apart within the array without any intervening lasers, in some embodiments, there are intervening intermediate lasers, and the individual lasers and/or groups of lasers activated during operation may be spaced apart in a staggered fashion as shown in the figure with one or more leading groups of lasers and one or more trailing groups of laser relative to a direction of travel of the laser array. In the particular embodiment illustrated in the figures, the pattern of laser spots 510 in FIG. 5B includes a first set of lasers 506a, 506c, and 506e arranged in a substantially linear arrangement along a first line, and lasers 506b and 506d are arranged in a substantially linear arrangement along a second line that is staggered from the first line such that the first and second sets of lasers are spaced from one another in a direction of travel of the laser array relative to the build surface. During operation, the lasers 506a, 506b, 506c, 506d, and 506e are operated to emit laser beams 508a, 508b, 508c, 508d, and 508e, respectively. The laser beams melt different portions of a layer of material (not shown) on the build surface 502, forming multiple, spaced melt pools 512a, 512b, 512c, 512d, and 512e. The resulting melt pools are located at spaced apart regions of the build surface with a first set of leading melt pools, 510b and 510d, located closer to a leading edge of the laser array oriented in a direction of travel of the laser array and one or more separate sets of trailing melt pools, such as melt pools 510a, 510c, and 510e, that are located further away from the leading edge of the laser array relative to the direction of travel.

After forming the desired spaced apart and staggered sets of melt pools 510a-510e on the build surface 502, the laser beams 508 are then translated relative to the build surface 502, as shown in FIG. 5C. In this process, the melt pools 512 similarly translate as new material is melted by the laser beams 508 and subsequently cooled and solidify along the trailing edges of the melt pools to forming welds 514 with the desired weld height. As also illustrated in the figure, the melt pools formed by the one or more sets of trailing lasers may have melt pool widths and positioning on the build surface such that they are disposed between and/or proximate to the one or more welds formed by the one or more sets of leading lasers. Further, the one or more sets of lasers may be translated at least partially along a length of one or more sets of leading welds such that the melt pools and subsequently formed welds from these one or more sets of trailing lasers may extend at least partially along a length of the previously formed welds.

In some embodiments, it may be desirable to avoid coalescence of melt pools formed by one or more sets of leading lasers with melt pools formed by one or more sets of trailing lasers relative to a direction of travel of a laser array. Thus, a separation distance between the leading and trailing lasers relative to a direction of travel of the laser array; an amount of power delivered to the individual melt pools; a translation speed of the lasers relative to the build surface; a rate of cooling of the melt pools; and/or any other appropriate operating parameters may be appropriately selected such that trailing edges of the leading melt pools may solidify prior to the leading edges of the trailing melt pools reaching the same location relative to a path of travel of the lasers on the build surface. For example, as best illustrated in FIG. 5C, the leading melt pools 510b and 510d may cool and solidify to form welds 514b and 514d before the trailing melt pools 514a, 514c, and 514e formed by the set of trailing lasers 512a, 512c, and 512e reaching a corresponding location in the direction of travel of the laser array. Thus, coalescence of the individual melt pools may be avoided. Again, the various welds may combine to various degrees as described above in relation to FIGS. 3A-3C. While the melt pools and subsequently formed welds are not shown as overlapping in the depicted figures, it should be understood that a lateral spacing and operating parameters of the staggered array of lasers may be selected such that the trailing melt pools may at least partially overlap with the previously formed welds. As noted above, overlapping welds may help promote a smooth top surface.

Figure 6:
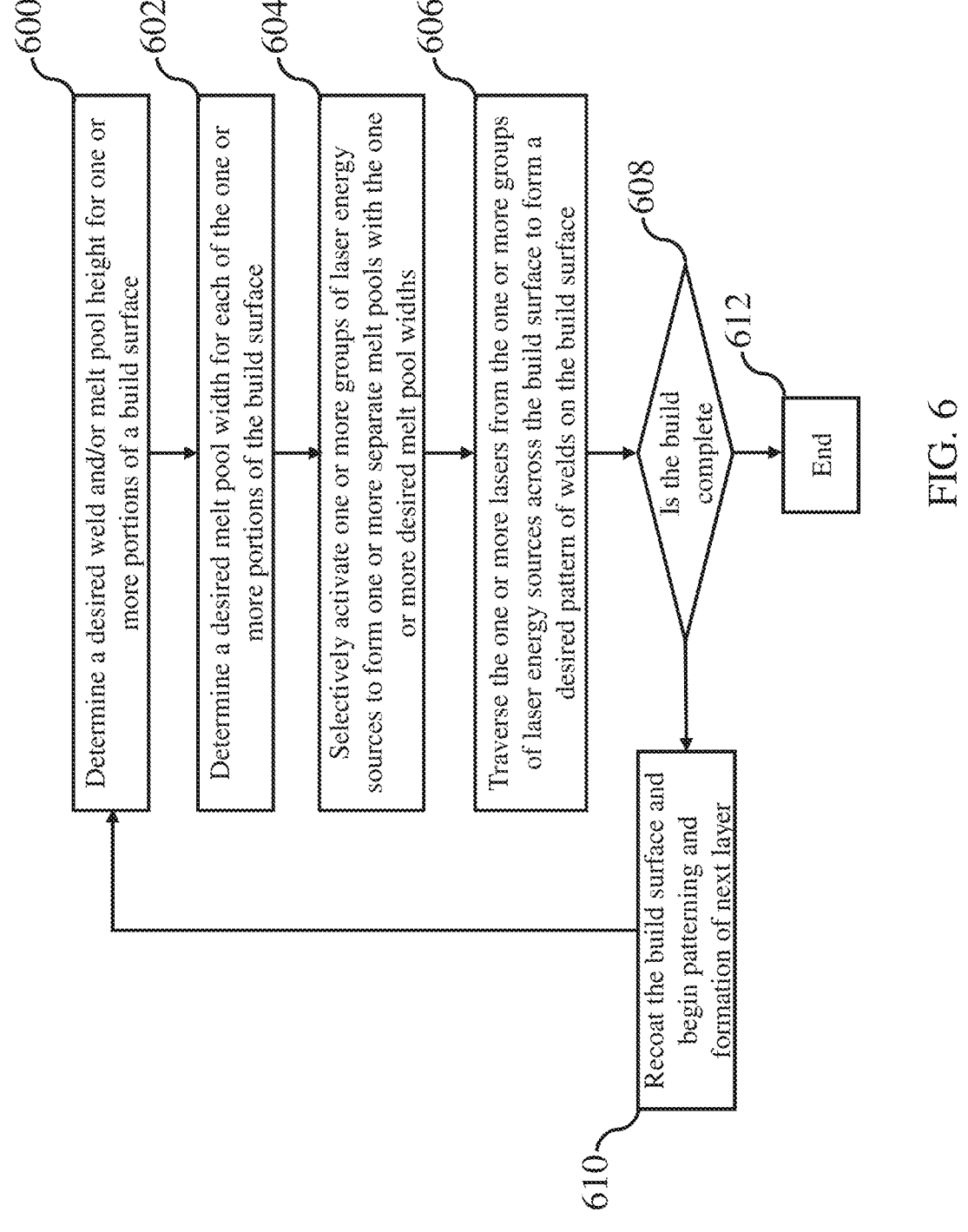
FIG. 6 depicts one embodiment of a method for operating an additive manufacturing system.

FIG. 6 depicts one embodiment of a method for operating an additive manufacturing system. At 600, a processor of the system may determine a desired weld and/or melt pool height for one or more portions of the build surface. For example, one, two, three, and/or any other appropriate number of desired weld and/or melt pool heights may be used on one or more portions of a build surface when operating the system to form a given layer of a part. It should be understood that different weld and/or melt pool heights may be used both within a single layer and/or within different adjacent layers of a part. For example, a second, third or any appropriate number of different melt pool widths may be determined at least in part on a corresponding weld height which may be different from the weld height used in a another portion of an individual layer and/or in a separate layer of the part being formed by the additive manufacturing system.

After determining a desired weld and/or melt pool height, the processor may determine a desired melt pool width for each portion of the build surface at 602. As previously discussed, a processor may control any appropriate operating parameters of the system to provide the desired melt pool width in each desired portion of the build surface including, for example, the number of activated lasers, the laser power, the dwell time and/or translation speed, the pulse rate, and the focus of the one or more lasers. Again, it should be understood, that the melt pool widths, and corresponding weld and and/or melt pool heights, may be the same and/or different in each of these locations as the disclosure is not limited in this fashion.

After determining the desired melt pool width, the array of lasers located on a laser array of the system may be operated to selectively activate one or more groups of the laser energy sources to form the one or more separate melt pools on the build surface with the desired one or more melt pool widths at 604. The processor may then operate the laser array to traverse the one or more lasers emitted from the one or more groups of laser energy sources such that the lasers traverse across the build surface to form a desired pattern of welds to form a layer of the part. As described previously, either one or multiple passes of the laser array may be used to form a desired layer using any of the methods described herein. At 608, the processor may determine if the build is complete. If the build is complete, the process may be ended. If the build is not complete, processor may operate the system to recoat the build surface with an appropriate material and begin patterning and formation of the next layer using the above noted methods until the build process is complete.

Example: Adjacent Laser Spots in a Line

In some embodiments, an incident laser beam may include a line on a build surface formed by beam shaping of a single laser source. In some embodiments, an incident laser may include a line formed on a build surface from multiple incident laser beams that are adjacent to each other. A width of the line on a build surface may be determined by the number of individual pixels. The incident power level of each pixel may be uniform or may vary compared to any other pixel. The width of the line may in part determine the height of the melt pool based in part on surface tension effects. As this melt pool solidifies, the resulting weld may be the same height as the melt pool. Without wishing to be bound by theory, the wider the incident laser spot or line, the wider the melt pool and the higher the center point of the weld.

For a single 80 μm spot size fusing a 50 μm tall layer of material, the thickest point of the resulting melt pool may be 60-70 μm high with the melt pool tapering off on either side of the peak. This peak is higher than the nominal layer thickness, but on average the melt pool height, and associated weld thickness, may be on the order of the nominal layer thickness. This peak melt pool height may still be below the height of the next layer and should be unlikely to cause any interference issues with a recoater.

If this process is repeated with a line that consists of two adjacent laser spots, each of which is 80 μm in size, the resulting melt pool may be 160 μm wide with a height that may be 80-90 μm high. This increased height may be due in part to the surface tension of the liquid metal. An average weld height may still be on the order of the nominal layer thickness, but the peak height of the weld may be higher than the peak height of a weld formed by a single laser spot. This peak height (of a weld formed by two adjacent laser spots) may still be less than the recoating height of the next layer, and thus may not cause any recoater issues.

If the process is repeated again with three laser spots forming a 240 μm line, the resulting weld may be 120-130 μm high at its peak, but may still be the same average layer thickness. This weld may now be sufficiently tall to be higher than the next layer height. The peak points of such a weld may cause interference with the next recoating process which may cause a poor recoating quality and/or cause damage to the recoater blade. The width of the line may be limited based on the specific molten metal behavior of a given material and the layer height.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

What is claimed is:

1. An additive manufacturing system comprising:
a build surface;
a plurality of laser energy sources;
an optics assembly optically coupled to the plurality of laser energy sources and configured to direct laser energy from the plurality of laser energy sources toward the build surface; and
a processor operatively coupled to the plurality of laser energy sources, the processor configured to determine one or more operating parameters for the plurality of laser energy sources and/or the optics assembly predicted to produce a desired weld height for a portion of a fused layer of a part to be built by the additive manufacturing system, the processor configured to determine the one or more operating parameters by:
using the desired weld height and a desired melt pool height to determine a desired melt pool width predicted to produce the desired weld height and the desired melt pool height, wherein the desired weld height is different from the desired melt pool height; and
determining the one or more operating parameters such that exposure of a portion of a layer of material on the build surface to the laser energy from one or more laser energy sources of the plurality of laser energy sources activated according to the one or more operating parameters is predicted to form the portion of the fused layer having the desired weld height by melting the portion of the layer of material to form one or more melt pools having the desired melt pool width and/or the desired melt pool height; and wherein
the processor is further configured to control the optics assembly and/or the one or more laser energy sources of the plurality of laser energy sources according to the one or more operating parameters.

2. The additive manufacturing system of claim 1, wherein the one or more operating parameters comprises a number of laser energy sources to be activated, a laser power density, a laser scan speed, a laser spot size, a laser focus, and/or a laser pulse rate.

3. The additive manufacturing system of claim 1, wherein the one or more melt pools forms one or more liquid menisci on the build surface.

4. The additive manufacturing system of claim 3, wherein a maximum height of the one or more liquid menisci is less than the desired weld height.

5. The additive manufacturing system of claim 3, wherein a maximum height of the one or more liquid menisci is equal to the desired weld height.

6. The additive manufacturing system of claim 1, wherein the plurality of laser energy sources are configured as an array of laser energy sources, and wherein the processor is configured to selectively activate two or more adjacent laser energy sources of the array to form the one or more melt pools.

7. The additive manufacturing system of claim 1, wherein the one or more melt pools includes a first melt pool, and wherein the processor is further configured to form a second melt pool on the build surface via exposure of a second portion of the layer of material on the build surface to the laser energy from the activated laser energy sources.

8. The additive manufacturing system of claim 7, wherein the second melt pool is physically spaced from the first melt pool on the build surface.

9. The additive manufacturing system of claim 8, wherein a spacing between the first and second melt pools is between 25 µm and 100 mm.

10. The additive manufacturing system of claim 8, wherein a spacing between the first and second melt pools is based, at least in part, on a material property of the layer of material on the build surface.

11. The additive manufacturing system of claim 10, wherein the material property is a surface tension of the layer of material when the layer of material is melted.

12. The additive manufacturing system of claim 7, wherein the second melt pool is formed after the first melt pool is solidified to form a first portion of a fused layer.

13. The additive manufacturing system of claim 12, wherein a position of the second melt pool is adjacent a position of the first melt pool.

14. The additive manufacturing system of claim 1, wherein the desired melt pool width is between 50 µm and 5 mm.

15. The additive manufacturing system of claim 1, wherein the desired weld height is between 20 µm and 5 mm.

16. The additive manufacturing system of claim 1, wherein the processor is further configured to control a width of the one or more melt pools by adjusting a focus of one or more of the activated laser energy sources.

17. The additive manufacturing system of claim 1, wherein forming the one or more melt pools includes forming a plurality of melt pools including at least one leading melt pool and at least one trailing melt pool, wherein the at least one leading melt pool solidifies prior to the at least one trailing melt pool contacting the at least one leading melt pool.

18. An additive manufacturing system comprising:
a build surface;
a plurality of laser energy sources;
an optics assembly optically coupled to the plurality of laser energy sources and configured to direct laser energy from the plurality of laser energy sources toward the build surface; and
a processor operatively coupled to the plurality of laser energy sources, the processor configured to:
determine a desired weld height and/or a desired melt pool height;
determine a desired melt pool width based on the desired weld height and/or the desired melt pool height;
determine one or more operating parameters of at least one of the plurality of laser energy sources and/or the optics assembly based on the desired melt pool width, such that exposure of a portion of a layer of material on the build surface to the laser energy from the at least one of the plurality of laser energy sources activated according to the one or more operating parameters fuses a portion of the layer having the desired weld height by melting the portion of the layer to form one or more melt pools having the desired melt pool height and/or the desired melt pool width; and
control the optics assembly and/or the at least one of the plurality of laser energy sources according to the one or more operating parameters.

19. The additive manufacturing system of claim 18, wherein the desired melt pool width is only determined by the desired weld height.

20. The additive manufacturing system of claim 18, wherein the desired melt pool width is only determined by the desired melt pool height.

21. The additive manufacturing system of claim 18, wherein the plurality of laser energy sources are configured as an array of laser energy sources, and wherein the processor is configured to selectively activate two or more adjacent laser energy sources of the array to form the one or more melt pools.

22. The additive manufacturing system of claim 18, wherein the one or more melt pools include a first melt pool, and wherein the processor is configured to form a second melt pool on the build surface via exposure of a second portion of the layer of material on the build surface to the laser energy from the activated laser energy sources according to the one or more operating parameters.

23. The additive manufacturing system of claim 18, wherein the processor is configured to cause adjustment of a focus of one or more of the activated laser energy sources to control a width of the one or more melt pools.

24. The additive manufacturing system of claim 18, wherein the one or more operating parameters comprises a number of laser energy sources to be activated, a laser power density, a laser scan speed, a laser spot size, a laser focus, and/or a laser pulse rate.

25. The additive manufacturing system of claim 18, wherein the one or more melt pools forms one or more liquid menisci on the build surface.

26. The additive manufacturing system of claim 25, wherein a maximum height of the one or more liquid menisci is less than the desired weld height.

27. The additive manufacturing system of claim 25, wherein a maximum height of the one or more liquid menisci is equal to the desired weld height.

28. The additive manufacturing system of claim 18, wherein the plurality of laser energy sources is configured as an array of laser energy sources, and wherein the processor is configured to selectively activate two or more adjacent laser energy sources of the array to form the one or more melt pools.

29. The additive manufacturing system of claim 18, wherein the one or more melt pools includes a first melt pool, and wherein the processor is further configured to form a second melt pool on the build surface via exposure of a second portion of the layer of material on the build surface to the laser energy from the activated laser energy sources.

30. The additive manufacturing system of claim 29, wherein the second melt pool is physically spaced from the first melt pool on the build surface.

31. The additive manufacturing system of claim 30, wherein a spacing between the first and second melt pools is between 25 μm and 100 mm.

32. The additive manufacturing system of claim 30, wherein a spacing between the first and second melt pools is based, at least in part, on a material property of the layer of material on the build surface.

33. The additive manufacturing system of claim 32, wherein the material property is a surface tension of the layer of material when the layer of material is melted.

34. The additive manufacturing system of claim 29, wherein the second melt pool is formed after the first melt pool is solidified to form a first portion of a fused layer.

35. The additive manufacturing system of claim 34, wherein a position of the second melt pool is adjacent a position of the first melt pool.

36. The additive manufacturing system of claim 18, wherein the desired melt pool width is between 50 μm and 5 mm.

37. The additive manufacturing system of claim 18, wherein the desired weld height is between 20 μm and 5 mm.

38. The additive manufacturing system of claim 18, wherein the processor is further configured to control a width of the one or more melt pools by adjusting a focus of one or more of the activated laser energy sources.

39. The additive manufacturing system of claim 18, wherein forming the one or more melt pools includes forming a plurality of melt pools including at least one leading melt pool and at least one trailing melt pool, wherein the at least one leading melt pool solidifies prior to the at least one trailing melt pool contacting the at least one leading melt pool.

* * * * *